United States Patent [19]

Burggraaf et al.

[11] Patent Number: 5,076,926
[45] Date of Patent: Dec. 31, 1991

[54] MODIFIED MEMBRANE

[75] Inventors: Anthonie J. Burggraaf; Klaas Keizer; Robert J. R. Uhlhorn, all of AE Enschede, Netherlands

[73] Assignee: Shell Oil Company, Houston, Tex.

[21] Appl. No.: 514,817

[22] Filed: Apr. 26, 1990

[30] Foreign Application Priority Data

Apr. 28, 1989 [NL] Netherlands .................. 8901080

[51] Int. Cl.⁵ .................. B01D 61/18; B01D 71/02; B01D 71/04
[52] U.S. Cl. .................. 210/500.25; 264/41.5; 264/45.5; 427/244
[58] Field of Search .................. 264/41, 41.5, 45.5, 264/DIG. 61, DIG. 48; 210/500.25, 500.26

[56] References Cited

U.S. PATENT DOCUMENTS 4,929,406  5/1990  Abe et al. .................. 264/45.5

Primary Examiner—Frank Sever
Attorney, Agent, or Firm—Ronald R. Reper

[57] ABSTRACT

A process is provided for modifying a ceramic ultrafiltration membrane system consisting of a sub-microporous top layer and a microporous inorganic carrier whereby said top layer after modification has reduced pore size and/or is made catalytically active.

24 Claims, 1 Drawing Sheet

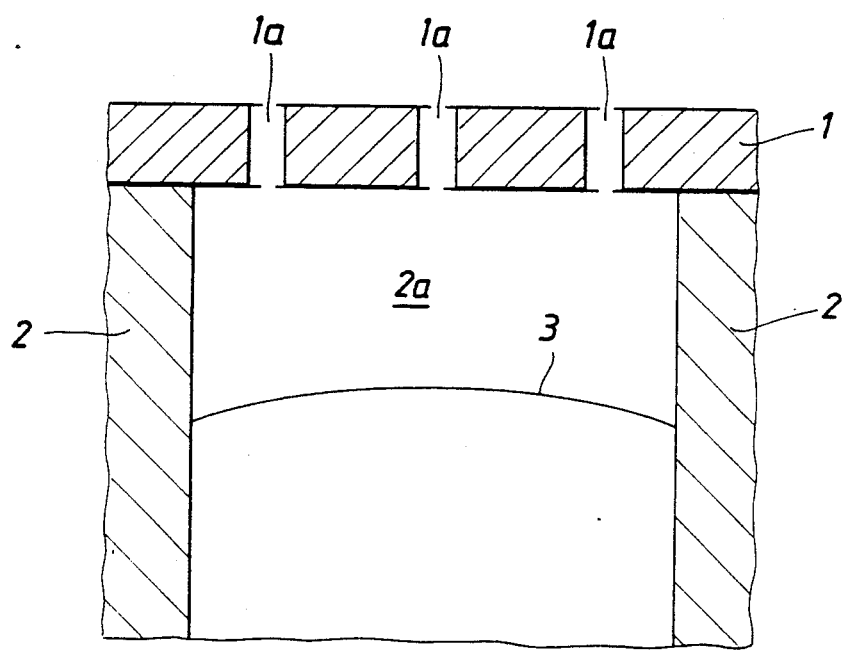

MODIFIED MEMBRANE

BACKGROUND OF THE INVENTION

The invention relates to a process for reducing the size of pores and/or making catalytically active a membrane top layer in a ceramic ultrafiltration membrane system consisting of a sub-microporous top layer and a microporous inorganic carrier. An ultrafiltration membrane is understood to be a membrane with pores smaller than 0.02 μm. Ceramic ultrafiltration membrane systems consisting of a microporous top layer and a microporous inorganic carrier, as well as a process for the production thereof, are known from EP-A-0144097.

Gas separation applications (on the basis of Knudsen diffusion or other mechanisms) requires a high quality top layer and the top layer on the carrier according to EP-A-0144097 often does not meet these quality requirements. This requirement is that 100% Knudsen diffusion (within a measuring error of 2%) takes place for helium in the top layer up to a pressure of 10 bar. If this is not the case, the procedure according to EP-A-0144097 is repeated once or twice (repair). The selectivity of gas separation according to the Knudsen diffusion mechanism is low (equal to the root of the mol mass ratio of the gases) and can be improved by reducing the pore size via modification in such membrane systems.

This is necessary for realizing new applications for such membrane system, e.g., in oil conversion processes. Another example of modification is the application of a catalytically active material onto and/or into the membrane top layer and the use as catalytically active membrane system in chemical processes at higher temperatures (>200° C.).

The invention now provides a process and a membrane with which these objects can be achieved.

SUMMARY OF THE INVENTION

The process according to the invention is characterized in that only the membrane top layer is modified in situ. The in situ modification process according to the invention is advantageously carried out by performing the following steps: a) impregnating the top layer, using the carrier as impregnation liquid reservoir; b) concentrating the impregnation liquid in the top layer; and c) precipitating material in the pores of the top layer via a chemical reaction between components present in the impregnation liquid.

The invention also relates to a membrane system whose top layer is modified in situ according to the aforesaid process, as well as to the use of a membrane system thus obtained.

DESCRIPTION OF PREFERRED EMBODIMENTS

According to the process of the invention, step a) is carried out with the aid of a metal salt and an aqueous solution containing urea; step b) consists of drying the membrane system under controlled conditions; and step c) consists of heating the membrane system to a predetermined temperature at which urea decomposes to ammonia, the metal component hydrolyzes in situ in the top layer and the metal hydroxide thus formed precipitates onto the solid present in the top layer.

It is pointed out that the use of the urea method for precipitating finely divided material into/onto a catalyst is known from the article by De Jong and Geus in "Study Surf. Sci. Catal. 16 (1983) 111–21". There is no question here, however, of modifying the top layer in order to reduce the pore size or to make it catalytically active in membrane composites.

The invention will now be explained in more detail with reference to the drawing and the examples, the FIGURE schematically showing a cross-section through a membrane system consisting of a top layer and a carrier, the carrier being used as an impregnation reservoir.

The FIGURE shows the best mode of the invention.

With reference to the FIGURE, a top layer 1 and a carrier 2 are represented. The top layer 1 is provided with pores 1a and the carrier 2 is provided with pores 2a with a greater diameter than the pores 1a. A meniscus 3 of an impregnation liquid is drawn in one of the pores 2a.

According to the invention, a supported membrane system consisting of a top layer and a carrier is completely impregnated with a liquid, the carrier being used as a reservoir for the impregnation liquid. After some time, this system is dried under controlled conditions. Due to the smaller pores in the ultrafiltration top layer, all the liquid will be concentrated in the top layer by the action of capillary forces during the drying process.

A chemical reaction is allowed to take place in the top layer between the components of the impregnation liquid. This can be initiated by heating to a certain temperature (for example 90°–100° C.), at which the urea decomposes to ammonia that reacts with the water and hydrolyzes the metal component in situ in the top layer.

After the hydrolysis, the hydroxide thus obtained can decompose by careful heating to 450° C. This temperature can, however, be lower so that the hydroxide is not fully dehydrated to an oxide.

The concentration and reaction steps of the process according to the invention can take place simultaneously or separately (successively), depending on the temperature.

This enables the distribution of the precipitation in the top layer to be varied. Analyses of the system with EDS (energy dispersive X-ray) analysis and SEM (scanning electron microscopic) show that in the case of the metal being magnesium, this is present entirely in the microscopic top layer. Such analytical techniques are known to those skilled in the art and will not be described further.

The concentration factor is dependent on the carrier and membrane thickness, so that high modification concentrations can be achieved. As has been pointed out above, the carrier should be used as a reservoir for the impregnation liquid.

Since the volume of the carrier is at least 100 times greater than the top layer, the whole system can be impregnated with a relatively low concentration of the urea/salt solution.

During the drying step, the volume of the liquid is reduced. Due to capillary forces (assuming good wetting), the larger pores will first become empty in favor of the smaller pores. The liquid is thus concentrated in the top layers. The concentration rate depends on the process conditions and the kinetics of the salt crystallization.

Once the concentration in the top layer has taken place, the reaction can be carried out. The reaction kinetics relative to the dry kinetics determines the size of the overlap between the drying step and the reaction step. In addition, the distribution of the modification over the membrane top layer can be varied according to a relationship between reaction rate and process control.

The invention will now be further explained with reference to some examples:

EXAMPLE 1

A membrane system (with $\gamma$-$Al_2O_3$ top layer) is impregnated with 0.05 mol $Mg(NO_3)_2$ and 0.1 mol urea solution. The drying step and reaction step are then carried out simultaneously at 90° C. After drying at 150° C. it was found that the membrane system was "gastight" for $N_2$. After transformation of the hydroxide to oxide at 450° C., it was found that the permeability of the modified top layer had decreased by a factor of 2 relative to the non-modified top layer.

This means, furthermore, that the modified material can withstand heat treatments. The coefficient of expansion of MgO is 1.5× larger than that of $Al_2O_3$, so this result could not have been anticipated.

The quantity of MgO (larger in the top layer) is about 20-25% w. The normal method gives a maximum loading of 2.5% w. MgO impregnation gives considerably improved polyethylene glycol retention.

EXAMPLE 2

A membrane system (with $\gamma$-$Al_2O_3$ top layer) is impregnated with 0.01-0.05 mol $AgNO_3$ and 0.02-0.1 mol urea solution. Due to the fact that the reaction of $AgNO_3$ with ammonia is much faster, the drying step and reaction step are here separate, since otherwise silver oxide would already precipitate in the carrier. Drying takes place at 40° C./60% relative humidity for 12 hours, after which the reaction is carried out at 90° C. for some hours. In this case as well, a tight membrane can be obtained at 150° C. After calcination, the permeability of the top layer has also dropped by a factor of 2 relative to the unmodified membrane. Loadings of up to 65% w (26 vol %) were made. Half of the free volume of the top layer is then occupied by silver particles with a size of between 5 and 20 nm. No homogeneous silver layer is found on the $\gamma$-$Al_2O_3$ top layer.

This was due to the fact that the drying step and the reaction step are completely separate. After reaction and a heat treatment, the concentration is the highest at the top of the top layer and lower at the side of the carrier. After a treatment at 450° C. it is found that the silver coagulates to a size of 5-20 nm. This is probably caused by the poor wetting of silver on $\gamma$-$Al_2O_3$. Oxygen plays an important role here. After heat treatments, this membrane also, surprisingly, remains whole, despite expansion differences between $Al_2O_3$, Ag and $Ag_2O$.

The reservoir method mentioned in the examples can also be used on other membrane top layers, e.g., $TiO_2$, and for other modification systems (e.g., $ZrO_2$, $Al_2O_3$). Each example, however, requires its own process control. Adjustment of the distribution of modification is also possible in the top layer. This requires a good technique for analyzing the composition distribution in the top layer.

What is claimed is:

1. Process for reducing the size of pores of a membrane top layer in a ceramic ultrafiltration membrane system consisting of a microporous top layer and a microporous inorganic carrier, wherein only the membrane top layer is modified in situ by means of the following steps:

a) impregnating said top layer with an impregnation liquid containing components which may react chemically to form a precipitate, using the carrier as impregnation liquid reservoir;
   b) concentrating said impregnation liquid in said top layer, and
   c) precipitating material in the pores of said top layer via a chemical reaction between components present in said impregnation liquid.

2. Process according to claim 1, wherein step a) is carried out with the aid of a metal salt and an aqueous solution containing urea; step b) consists of drying the membrane system under controlled conditions; and that step c) consists of heating the membrane system to a predetermined temperature at which urea decomposes to ammonia and the metal component hydrolyzes in situ in the top layer and the metal hydroxide thus formed precipitates onto the solid present in the top layer.

3. Process according to claim 2, wherein steps b) and c) are carried out simultaneously.

4. Process according to claim 3, wherein steps b) and c) are carried out at a temperature of about 90° C.

5. Process according to claim 2, wherein steps b) and c) are carried out separately.

6. Process according to claim 5, wherein step b) is carried out at a temperature of about 40° C. and 60% relative humidity for 12 hours, and that step b) is carried out at a temperature of about 90° C. for from about 1 to 24 hours.

7. Process according to claim 2, wherein in step c) the precipitation takes place by heating to 450° C.

8. Process according to claim 2, wherein in step a) the metal salt is $Mg(NO_3)_2$.

9. Process according to claim 2, wherein in step a) the metal salt is $AgNO_3$.

10. Process according to claim 1, wherein said membrane system has a top layer of $\gamma$-$Al_2O_3$.

11. Process according to claim 1, wherein said membrane system has a top layer of $TiO_2$.

12. Membrane system product having a top layer that is modified in situ according to the process of claim 1.

13. Process for making catalytically active a membrane top layer in a ceramic ultrafiltration membrane system consisting of a microporous top layer and a microporous inorganic carrier, wherein only the membrane top layer is modified in situ by means of the following steps:

a) impregnating said top layer with an impregnation liquid containing components which may react chemically to form a precipitate, using the carrier as impregnation liquid reservoir;
   b) concentrating said impregnation liquid in said top layer, and
   c) precipitating material in the pores of said top layer via a chemical reaction between components present in said impregnation liquid.

14. Process according to claim 13, wherein step a) is carried out with the aid of a metal salt and an aqueous solution containing urea; step b) consists of drying the membrane system under controlled conditions; and that step c) consists of heating the membrane system to a predetermined temperature at which urea decomposes to ammonia and the metal component hydrolyzes in situ in the top layer and the metal hydroxide thus formed precipitates onto the solid present in the top layer.

15. Process according to claim 13, wherein steps b) and c) are carried out simultaneously.

16. Process according to claim 13, wherein steps b) and c) are carried out separately.

17. Process according to claim 13 wherein steps b) and c) are carried out at a temperature of about 90° C.

18. Process according to claim 13, wherein step b) is carried out at a temperature of about 40° C. and 60% relative humidity for 12 hours, and that step b) is carried out at a temperature of about 90° C. for from about 1 to 24 hours.

19. Process according to claim 13, wherein in step c) the precipitation takes place by heating to 450° C.

20. Process according to claim 13, wherein in step a) the metal salt is $Mg(NO_3)_2$.

21. Process according to claim 13, wherein in step a) the metal salt is $AgNO_3$.

22. Process according to claim 13, wherein said membrane system has a top layer of $\gamma\text{-}Al_2O_3$.

23. Process according to claim 13, wherein said membrane system has a top layer of $TiO_2$.

24. Membrane system product having a top layer that is modified in situ according to the process of claim 13.

* * * * *